United States Patent
Sanderson et al.

(10) Patent No.: US 7,622,670 B1
(45) Date of Patent: Nov. 24, 2009

(54) JEWELRY TOOL

(76) Inventors: Tracy L. Sanderson, 6913 Drury St., Tampa, FL (US) 33635; Charles E. West, 6913 Drury St., Tampa, FL (US) 33635

( * ) Notice: Subject to any disclaimer, the term of this patent is extended or adjusted under 35 U.S.C. 154(b) by 0 days.

(21) Appl. No.: 12/384,032

(22) Filed: Mar. 30, 2009

Related U.S. Application Data (60) Provisional application No. 61/040,677, filed on Mar. 30, 2008.

(51) Int. Cl.
*H01B 11/06* (2006.01)
(52) U.S. Cl. .......................................................... 174/36
(58) Field of Classification Search .................. 174/36, 174/110 R, 111, 112, DIG. 9, 135
See application file for complete search history.

(56) References Cited

U.S. PATENT DOCUMENTS

| | | | |
|---|---|---|---|
| 1,179,700 A * | 4/1916 | Cornell ........................ | 379/438 |
| 3,014,087 A * | 12/1961 | Kaplan et al. .................. | 174/69 |
| 3,126,442 A * | 3/1964 | Roberts ........................ | 174/69 |
| 3,353,817 A * | 11/1967 | Bollinger ..................... | 267/69 |
| 4,770,332 A | 9/1988 | Pomerantz | |
| 6,233,345 B1 | 5/2001 | Urwyler | |
| 6,235,990 B1 | 5/2001 | Morris et al. | |
| 6,513,210 B1 * | 2/2003 | Gonzalez ..................... | 24/712 |
| 6,690,808 B2 | 2/2004 | Urwyler | |
| 7,202,414 B2 * | 4/2007 | Johnson ....................... | 174/36 |
| 2001/0010727 A1 | 8/2001 | Urwyler | |
| 2006/0185873 A1 | 8/2006 | Johnson | |

* cited by examiner

*Primary Examiner*—William H Mayo, III
(74) *Attorney, Agent, or Firm*—Frijouf, Rust & Pyle, P.A.

(57) ABSTRACT

A wire sheath for preventing entanglement of a wire and having a cross section dimension wherein the wire relays an electric current between a first end and a second end. The first end includes an electrical coupler and the second end including an electrical receiver, wherein a wire sheath comprises a cylindrical interwoven sheath defining an interior surface and an exterior surface extending between the first end and the second end. The interior surface defines an interior bore extending between the first end and the second end, wherein the interior bore defines a cylindrical diameter that is greater than the cross section dimension of the wire for positioning the wire through the interior bore of the cylindrical interwoven sheath. First and second terminal rings engage a first end of the cylindrical interwoven sheath and a second of the cylindrical interwoven sheath for permitting displacement of the cylindrical interwoven sheath relative to the wire, respectively. A sheath lock encompasses the cylindrical interwoven sheath and compresses the cylindrical interwoven sheath into the wire for terminating displacement of the cylindrical interwoven sheath relative to the wire.

10 Claims, 6 Drawing Sheets

JEWELRY TOOL

CROSS-REFERENCE TO RELATED APPLICATIONS

This application claims benefit of U.S. Patent Provisional application Ser. No. 61/040,677 filed Mar. 30, 2008. All subject matter set forth in provisional application Ser. No. 61/040,677 is hereby incorporated by reference into the present application as if fully set forth herein.

BACKGROUND OF THE INVENTION

1. Field of the Invention

This invention relates to sheaths and more particularly to a wire sheath for preventing entanglement of the wire.

2. Background of the Invention

The use of headphones has substantially increased in recent years, primarily as a result of the cell telephones, MP3 players and the like. As the design of headphones has evolved, they have become lighter and less restrictive to the user. Reducing the bulk of the headphone and more particularly, reducing the interconnecting wire size has resulted in headphones that are lighter and easier for the user to wear for longer periods of time. In an effort to provide more unrestricted mobility between the user and the source device, longer interconnecting wires have been employed. The combination of length and reduced interconnecting wire size has resulted in wires that are frequently twisted and intertwined in a tangle. This problem continues to serves as an annoyance and hazard to the user.

Although many of the devices of the prior art have improved the art, none have completely solved the problems associated with personal headphones and in particular personal headphone cords. The following U.S. Patents and applications are attempts of the prior art to address the needs of the art.

U.S. Pat. No. 4,770,332 to M. Pomerantz discloses a coiled line tangle inhibitor which comprises a flexible sheath that encases a relatively loosely coiled line to prevent it from tangling with itself as well as tangling with adjacent lines, which also would be sheathed by this invention. The sheath, although very flexible to allow free movement of the coiled line and any attached tool, has sufficient stiffness and diameter so that the coiled line can slide through an open end of the sheath with ease, but without self-meshing, as the line is extended and retracts in normal use.

U.S. Pat. No. 6,233,345 to P. Urwyler discloses a personal earphone assembly comprised of a flexible, elongate tube having open ends and a central lumen therethrough. Earphones are disposed at each open end of the tube, each earphone having a neck projecting therefrom and a wire passing from the neck, through the lumen, to a central aperture in the tube. In a stereophonic embodiment, the earphone wires run parallel from the central lateral aperture to a plug adapted to engage a stereo jack on a signal source. In a monaural embodiment, the earphone wires join a single double-strand lead to a mono jack. Lateral slits are provided adjacent the open ends of the tube for receipt of the temple ends of a pair of eyeglasses. The portions of the tube between the lateral apertures and the open ends wrap over and around the forward portions of a user's ear, and the earphones lodge in the outer ear canal. The assembly may also be worn without eyeglasses. In an alternative embodiment, a bead slidingly mounted on a doubled portion of the tube allows adjustment for a snug fit.

U.S. Pat. No. 6,235,990 to J. Morris et al. discloses a convenient compact telephone cord with a special coil diameter and a much smaller relaxed retracted length reducing sagging, occupies less space, and is much more attractive than conventional saggy telephone cords. The user-friendly high performance telephone cord has a core of electrical conductors which are insulated by primary insulation and are encased within an insulating jacket to meet or exceed national and international telephone standards and requirements. In the preferred form, the primary insulation comprises polypropylene and the insulating jacket comprises polyurethane and most preferably a blend of polyurethane and ethylene vinyl acetate. Desirably, the telephone cord comprises a modular retractile telephone cord with at least one modular plug. The attractive space-saving telephone cord can be used with handsets, headsets, vehicle phones, modems, and computers.

U.S. Pat. No. 6,690,808 to P. Urwyler discloses a personal earphone assembly comprised of a flexible, elongate tube having open ends and a central lumen therethrough. Earphones are disposed at each open end of the tube, each earphone having a neck projecting therefrom and a wire passing from the neck, through the lumen, to a central aperture in the tube. In a stereophonic embodiment, the earphone wires run parallel from the central lateral aperture to a plug adapted to engage a stereo jack on a signal source. In a monaural embodiment, the earphone wires join a single double-strand lead to a mono jack. Lateral slits are provided adjacent the open ends of the tube for receipt of the temple ends of a pair of eyeglasses. The portions of the tube between the lateral apertures and the open ends wrap over and around the forward portions of a user's ear, and the earphones lodge in the outer ear canal. The assembly may also be worn without eyeglasses. In an alternative embodiment, a bead slidingly mounted on a doubled portion of the tube allows adjustment for a snug fit. In yet another embodiment, the end portions of the elongate tube have a memory wire disposed therein, for bending the end portions into a configuration for optimally fitting the earphones within the outer ear canal of a user.

U.S. Pat. No. 7,202,414 to J. Johnson discloses an apparatus and method according to which a line extends through a sleeve so that a first amount of the line is disposed within the sleeve. After stretching and permitting the sleeve to retract, a second amount of the line is disposed within the sleeve, with the second amount being greater than the first amount. United States Patent Application 2001/0010727 to P. Urwyler discloses a personal earphone assembly comprised of a flexible, elongate tube having open ends and a central lumen therethrough. Earphones are disposed at each open end of the tube, each earphone having a neck projecting therefrom and a wire passing from the neck, through the lumen, to a central aperture in the tube. In a stereophonic embodiment, the earphone wires run parallel from the central lateral aperture to a plug adapted to engage a stereo jack on a signal source. In a monaural embodiment, the earphone wires join a single double-strand lead to a mono jack. Lateral slits are provided adjacent the open ends of the tube for receipt of the temple ends of a pair of eyeglasses. The portions of the tube between the lateral apertures and the open ends wrap over and around the forward portions of a user's ear, and the earphones lodge in the outer ear canal. The assembly may also be worn without eyeglasses. In an alternative embodiment, a bead slidingly mounted on a doubled portion of the tube allows adjustment for a snug fit. In yet another embodiment, the end portions of the elongate tube have a memory wire disposed therein, for bending the end portions into a configuration for optimally fitting the earphones within the outer ear canal of a user.

United States Patent Application 2006/0185873 to J. Johnson discloses an apparatus and method according to which a line extends through a sleeve so that a first amount of the line is disposed within the sleeve. After stretching and permitting the sleeve to retract, a second amount of the line is disposed within the sleeve, with the second amount being greater than the first amount.

Although the aforementioned prior art have contributed to the development of the art of personal headphones, none of these prior art patents have solved the needs of this art.

Therefore, it is an object of the present invention to provide an improved tubular cover for personal headphone wires.

Another object of this invention is to provide an improved tubular cover for personal headphone wires having a retaining device to prevent slippage of the cover on the headphone wires.

Another object of this invention is to provide an improved tubular cover for personal headphone wires that is simple to install.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a wire sheath for preventing entanglement of a wire. The wire has a cross-section dimension. The wire relays an electric current between a first end and a second end. The first end includes an electrical coupler and the second end including an electrical receiver. The wire sheath comprises a cylindrical interwoven sheath defining an interior surface and an exterior surface extending between a first end and a second end. The interior surface defines an interior bore extending between the first end and the second end. The interior bore defines a cylindrical diameter. The cylindrical diameter is greater than the cross-section dimension of the wire for positioning the wire through the interior bore of the cylindrical interwoven sheath. A first terminal ring engages the first end of the cylindrical interwoven sheath for permitting displacement of the cylindrical interwoven sheath relative to the wire. A second terminal ring engages the second end of the cylindrical interwoven sheath for permitting displacement of the cylindrical interwoven sheath relative to the wire. A sheath lock encompasses the cylindrical interwoven sheath and compresses the cylindrical interwoven sheath into the wire for terminating displacement of the cylindrical interwoven sheath relative to the wire. The cylindrical interwoven sheath has a tensile force for preventing a reduction of the distance between the first end and the second end. The cylindrical interwoven sheath has a linear retention force for preventing entanglement of the wire.

In a more specific embodiment of the invention, the first terminal ring includes a first polymeric ring integral to the first end. The second terminal ring includes a second polymeric ring integral to the second end. The sheath lock includes a wire clamp having an interior wire chamber and an exterior surface. The exterior surface of the sheath lock includes a continuous groove encircling the sheath lock. The sheath lock has a lock diameter less than the cylindrical diameter for inserting the sheath lock into the first end of the cylindrical interwoven sheath. The first polymeric ring engages within the groove for terminating displacement of the sheath lock relative to the cylindrical interwoven sheath.

In one embodiment of the invention, a wire lead has an electrical coupler receptacle coupled to a lead wire for facilitating the insertion of the wire within the cylindrical interwoven sheath. The wire lead is inserted through the interior bore and thereafter the electrical coupler receptacle is coupled with the electrical coupler for drawing the wire through the interior bore upon a drawing force being applied to the lead wire.

In another embodiment of the invention, the cylindrical interwoven sheath defines a plurality of planar rings positioned perpendicular to a plurality of planar ribbons.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

FIGS. 1-5 and 12-20 and 22 are various view of a wire sheath 10 for preventing entanglement of a wire 12. The wire 12 has a cross-section dimension 14. The wire 12 relays an electric current between a first end 16 and a second end 18. The first end 16 includes an electrical coupler 20 and the second end 18 including an electrical receiver 22. The electrical coupler 20 may include male jack 24 or other plugs. The electrical receiver 22 may include one or more audible speakers 26 or other electric devices.

Figures 1, 2, 3:
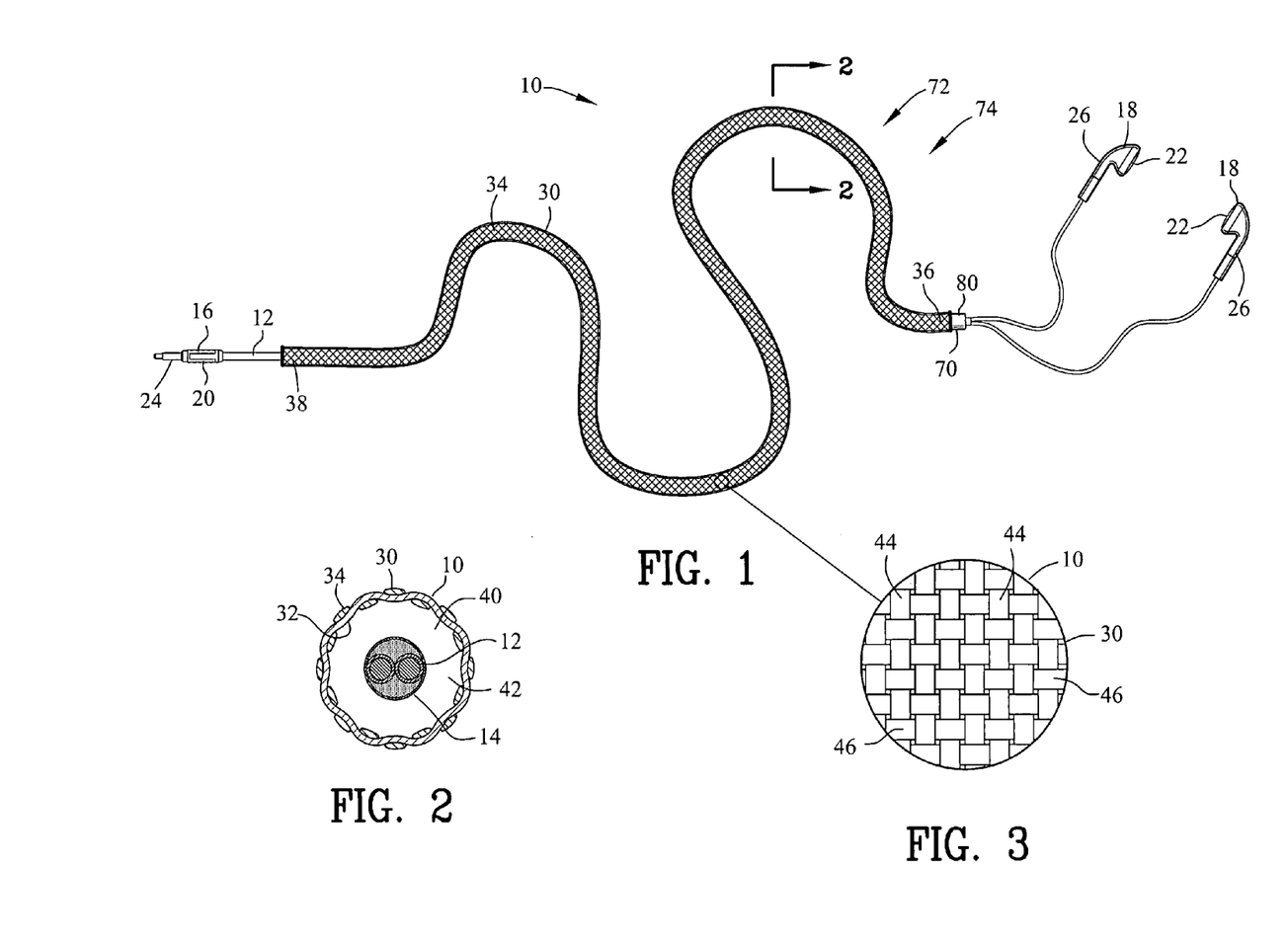
FIG. 1 is a top view of a wire sheath enclosing a portion of a wire for preventing entanglement of the wire incorporating the present invention.
FIG. 2 is a sectional view along line 2-2 in FIG. 1.
FIG. 3 is an enlarged portion of FIG. 1.
Figure 4:
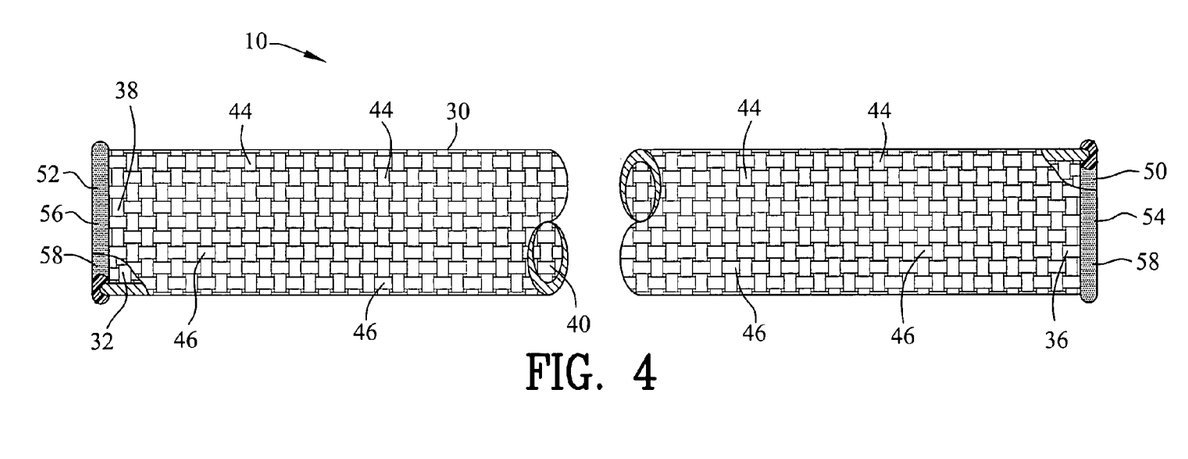
FIG. 4 is an enlarged view of FIG. 1 illustrating a first embodiment for a first and second terminal ring.

The wire sheath 10 comprises a cylindrical interwoven sheath 30 defining an interior surface 32 and an exterior surface 34 extending between a first end 36 and a second end 38. The interior surface 32 defines an interior bore 40 extending between the first end 36 and the second end 38. The interior bore 40 defines a cylindrical diameter 42. The cylindrical diameter is greater than the cross-section dimension 14 of the wire 12 for positioning the wire 12 through the interior bore 40 of the cylindrical interwoven sheath 30.

As best seen in FIG. 3, the cylindrical interwoven sheath 30 defining a plurality of planar rings 44 positioned perpendicular to a plurality of planar ribbons 46. Both the plurality of planar rings 44 and the plurality of planar ribbons 46 provide a tensile force 72 for preventing a reduction of the distance between the first end 36 and the second end 38 and a linear retention force 74 for preventing bending of the cylindrical interwoven sheath 30. Both the tensile force 72 and the linear retention force 74 assist in preventing entanglement of the wire 12. The cylindrical interwoven sheath 30 may be constructed of a synthetic stretch material such as: Spandex/Rayon, Nylon, Polyester, Tactel, Ultra Touch, Silky Touch, Meryl, Lycra, Lycra Soft, Micromattique, Coolmax, Novva, Supplex, Modal, Skinlife, Textured Yarns, etc.

A first terminal ring 50 engages the first end 36 of the cylindrical interwoven sheath 30 for permitting a smooth displacement of the cylindrical interwoven sheath 30 relative to the wire 12. A second terminal ring 52 engages the second end 38 of the cylindrical interwoven sheath 30 for permitting smooth displacement of the cylindrical interwoven sheath 30 relative to the wire 12.

As best seen in FIGS. 4 and 12-17, the first terminal ring may include a first polymeric ring 54 that is integral to the first end 36. Furthermore, the second terminal ring 52 may include a second polymeric ring 56 that is integral to the second end 38. Preferably the first polymeric ring 54 and the second polymeric ring 56 have a circular cross-section 58 for encapsulating both the interior surface 32 and the exterior surface 34 of the cylindrical interwoven sheath 30. Both the first polymeric ring 54 and the second polymeric ring 56 facilitate in the smooth displacement between the wire 12 and the cylindrical interwoven sheath 30.

Figure 5:
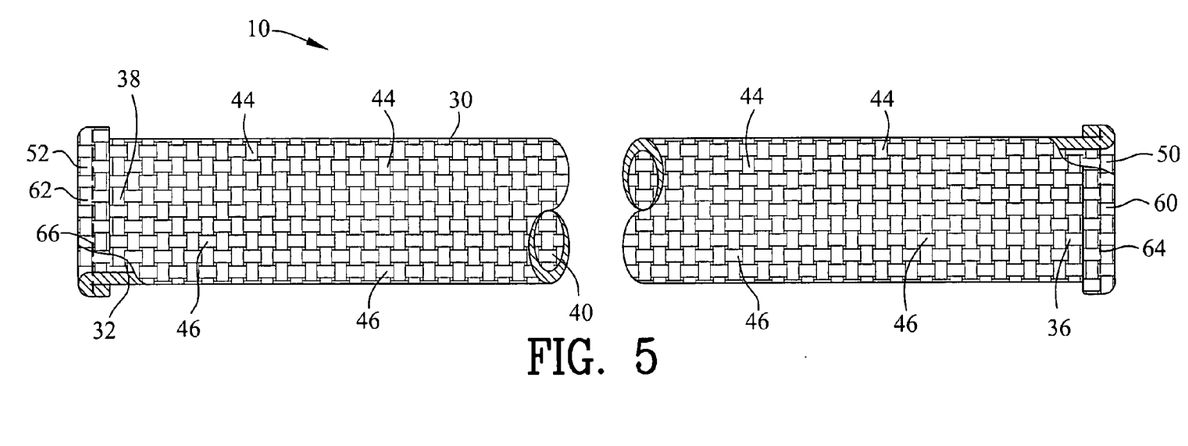
FIG. 5 is a view similar to FIG. 4 illustrating a second embodiment for a first and second terminal ring.
Figure 6:
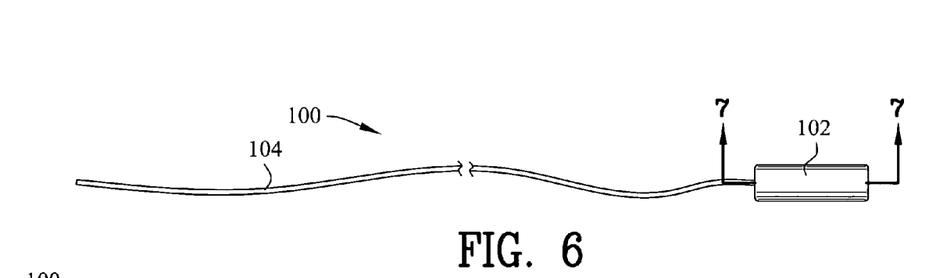
FIG. 6 is a side view of a wire lead having an electrical coupler receptacle coupled to a lead wire incorporating the present invention.
Figure 7:
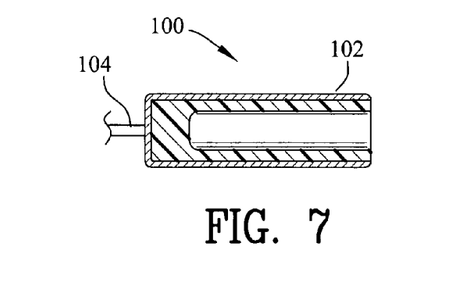
FIG. 7 is a sectional view along line 7-7 in FIG. 6.
Figure 8:
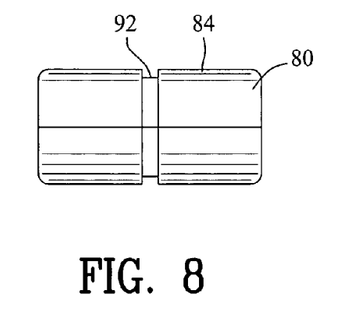
FIG. 8 is a side view of a wire clamp for terminating displacement of the wire sheath relative to the wire.
Figure 9:
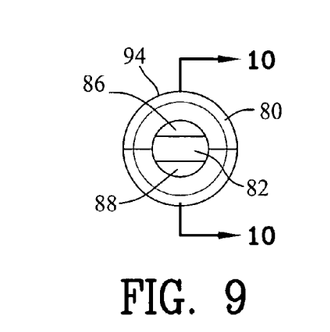
FIG. 9 is a left side view of FIG. 8.
Figure 10:
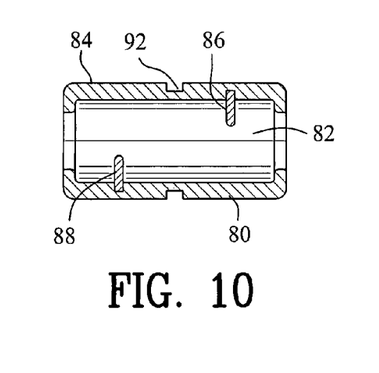
FIG. 10 is a sectional view along line 10-10 in FIG. 9.
Figure 11:
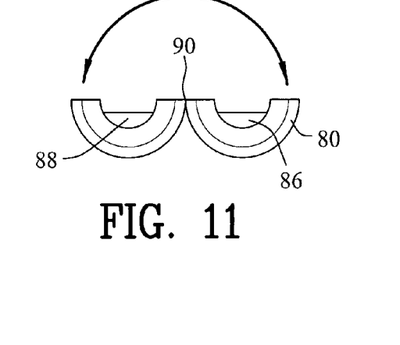
FIG. 11 is a view similar to FIG. 9 illustrating the wire clamp pivoted to an open position.
Figure 12:
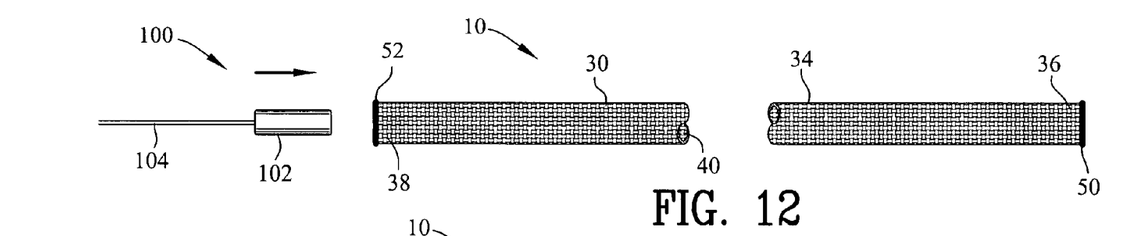
FIG. 12 is a view similar to FIG. 4 illustrating the wire lead positioned for insertion into the wire sheath.
Figures 13, 14, 15:
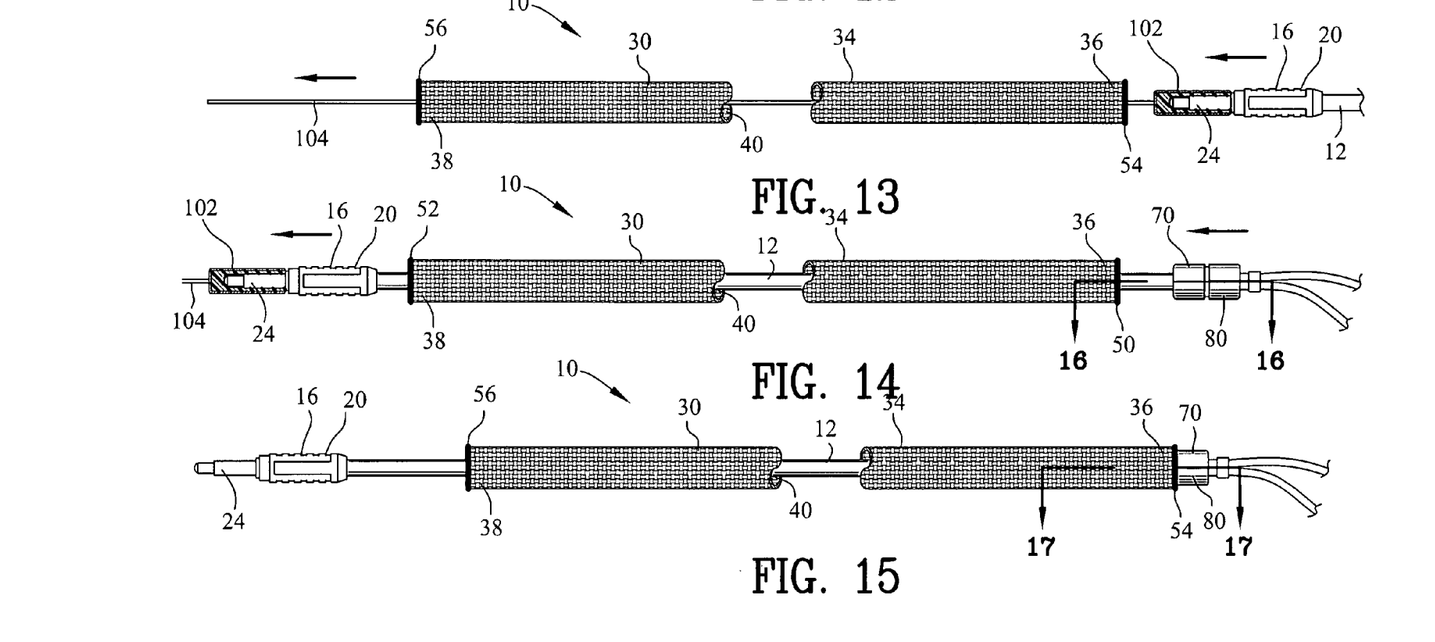
FIG. 13 is a view similar to FIG. 12 illustrating the wire lead traversed through the wire sheath and coupled to the wire.
FIG. 14 is a view similar to FIG. 13 illustrating the wire drawn through the wire sheath.
FIG. 15 is a view similar to FIG. 14 illustrating the wire clamp engaging the wire sheath.
Figure 16:
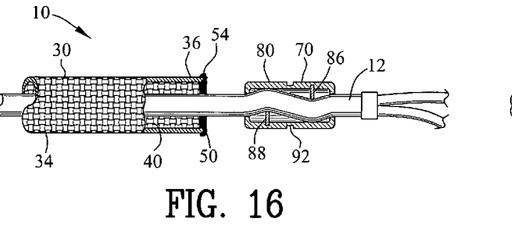
FIG. 16 a sectional view along line 16-10 in FIG. 14.
Figure 17:
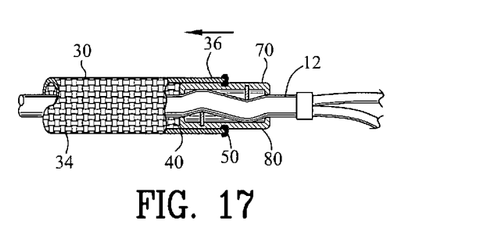
FIG. 17 is a sectional view along line 17-17 in FIG. 15.
Figure 18:
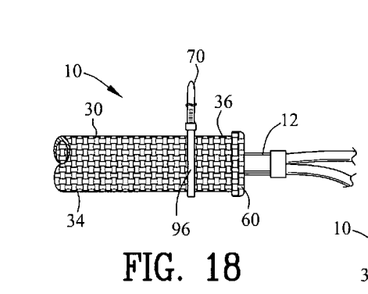
FIG. 18 is a view similar to FIG. 4 illustrating a wire tire positioned for engaging the wire sheath.
Figure 19:
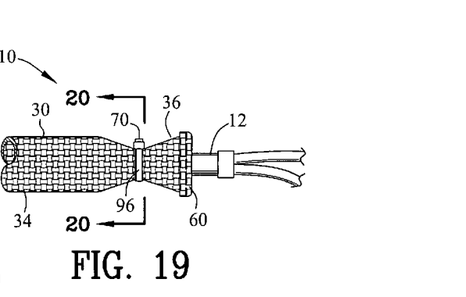
FIG. 19 is a view similar to FIG. 18 illustrating the wire tire engaging the wire sheath for terminating displacement of the wire sheath relative to the wire.

Alternatively as seen in FIGS. 5 and 18-19, the first terminal ring 50 may include a first folded sheath end 60. Furthermore, the second terminal ring 56 may include a second folded sheath end 62. The first folded sheath end 60 may be secured to the cylindrical interwoven sheath 30 by a first fastener 64. Similarly, the second folded sheath end 62 may be secured to the cylindrical interwoven sheath 30 by a second fastener. Both the first fastener 64 and the second faster 66 may include stitching, gluing or other fastening means.

A sheath lock 70 encompasses the cylindrical interwoven sheath 30 and compresses the cylindrical interwoven sheath 30 against the wire 12 for terminating displacement of the cylindrical interwoven sheath 30 relative to the wire 12. The cylindrical interwoven sheath 12 has a tensile force 72 for preventing a reduction of the distance between the first end 36 and the second end 38. Furthermore, the cylindrical interwoven sheath 30 has a linear retention force 74 for preventing bending of the cylindrical interwoven sheath 30. Both the tensile force 72 and the linear retention force 74 assist in preventing entanglement of the wire 12.

As seen in FIGS. 1, 8-17 and 22, the sheath lock 70 may include a wire clamp 80. The wire clamp 80 has an interior wire chamber 82 and an exterior surface 84. The internal wire chamber 82 includes a first locking rib 86 and the second locking rib 88. A clamp pivot 90 pivots the wire clamp 80 between an open position and a close position. The wire 12 may be positioned within the wire clamp 80 in the open position. Upon closing the wire clamp 80 the first locking rib 86 and the second locking rib 88 impresses the wire 12 in a zigzag orientation end up against the interior wire chamber 82. The impression against both the interior wire chamber 82 and the first locking rib 86 and the second locking rib 88 causes the wire 12 to terminate displacement of the wired 12 relative to the wire clamp 80.

Figure 20:
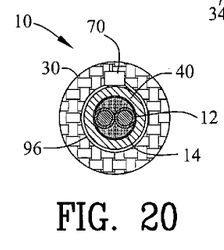
FIG. 20 is a sectional view along line 20-20 in FIG. 19.
Figure 21:
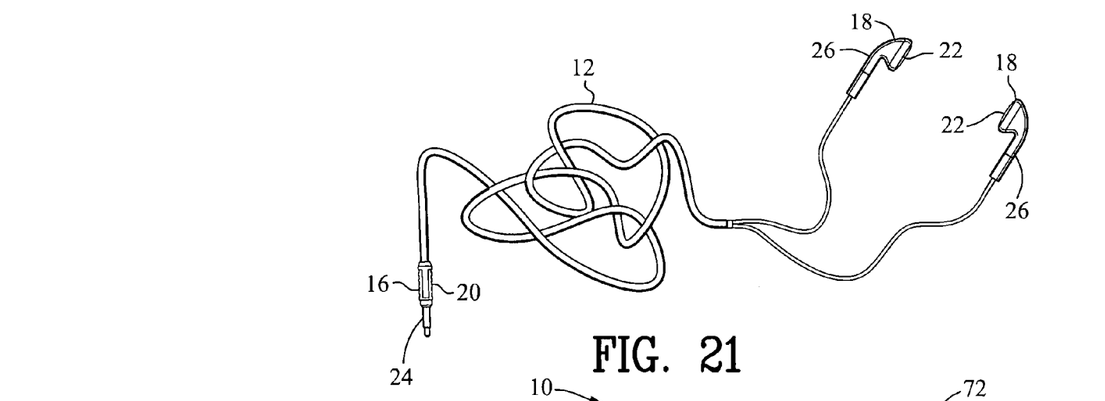
FIG. 21 is a top view of wire entangled upon itself.
Figure 22:
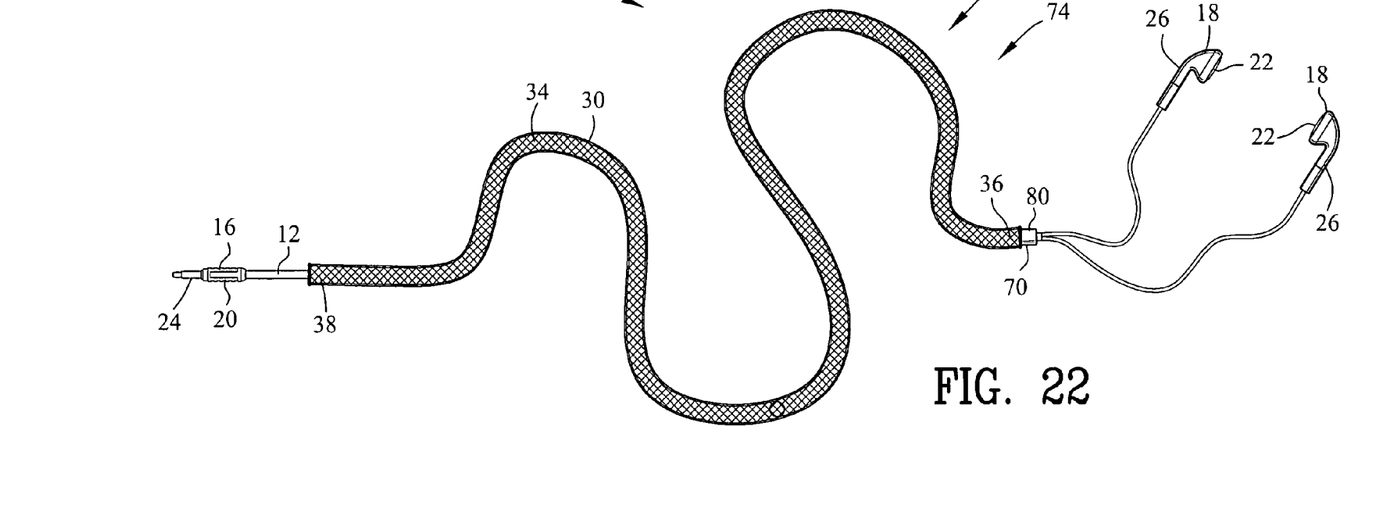
FIG. 22 is a view similar to FIG. 1 illustrating the wire sheath enclosing the wire for preventing entanglement of the wire.

The exterior surface 84 of the sheath lock 70 includes a continuous groove 92 that encircles the sheath lock 70. The sheath lock 70 has a lock diameter 94 less than the cylindrical diameter 42 for inserting the sheath lock 70 into the first end 36 of the cylindrical interwoven sheath 30. As seen in FIGS. 14-17, the first polymeric ring 54 engages within the continuous groove 92 for terminating displacement of the sheath lock 70 relative to the cylindrical interwoven sheath 30. As seen in FIGS. 18-20, the sheath lock may alternatively include a wire tire 96.

In order to facilitate the insertion of the wire 12 within the cylindrical interwoven sheath 30 a wire lead 100 may be utilized. The wire lead 100 has an electrical coupler receptacle 102 coupled to a lead wire 104. As seen in FIGS. 12-15, the wire lead 100 is first inserted through the interior bore 40. Thereafter the electrical coupler receptacle 102 is coupled with the electrical coupler 20 for drawing the wire 12 through the interior bore 40 upon a drawing force being applied to the lead wire 104. Upon the electrical coupler 20 traversing the second end 38, the wired lead 100 may thereafter be removed from the wire 12. The wire lead 100 may be constructed of Polyethylene Terephthalate, High Density Polyethylene, Polyvinyl Chloride, Polypropylene, Polystyrene, Alkyds, Acrylonitrile-Butadiene-Styrene (ABS), Cellulosics, Epoxy, Malamine-Formaldehyde, Nylon, Polyarylates, Polybutylene, Polycarbonate, Polyimides, Polyurethanes, Polyvinyl Acetate (PVAc) and Other Vinyls, Thermoplastic Polyester (Saturated), Unsaturated Polyester.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A wire sheath for preventing entanglement of a wire, the wire having a cross-section dimension, the wire relaying electric current between a first end and a second end, the first end including an electrical coupler and the second end including an electrical receiver, the wire sheath, comprising:
   a cylindrical interwoven sheath defining an interior surface and an exterior surface extending between a first end and a second end;
   said interior surface defining an interior bore extending between said first end and said second end;
   said interior bore defining a cylindrical diameter;
   said cylindrical diameter greater than the cross-section dimension of the wire for positioning the wire through said interior bore of said cylindrical interwoven sheath;
   a first terminal ring engaging said first end of said cylindrical interwoven sheath for permitting displacement of said cylindrical interwoven sheath relative to the wire;
   a second terminal ring engaging said second end of said cylindrical interwoven sheath for permitting displacement of said cylindrical interwoven sheath relative to the wire;
   a sheath lock encompassing said cylindrical interwoven sheath and compressing said cylindrical interwoven sheath into the wire for terminating displacement of said cylindrical interwoven sheath relative to the wire;
   said cylindrical interwoven sheath having a tensile force for preventing a reduction of the distance between said first end and said second end; and
   said cylindrical interwoven sheath having a linear retention force for preventing entanglement of the wire.

2. A wire sheath for preventing entanglement of a wire as set forth in claim 1, wherein said first terminal ring including a first polymeric ring integral to said first end; and
   said second terminal ring including a second polymeric ring integral to said second end.

3. A wire sheath for preventing entanglement of a wire as set forth in claim 1, wherein said first terminal ring including a first folded sheath end;
   a first fastener retaining said first folded sheath end with said cylindrical interwoven sheath;
   said second terminal ring including a second folded sheath end; and
   a second first fastener retaining said second folded sheath end with said cylindrical interwoven sheath.

4. A wire sheath for preventing entanglement of a wire as set forth in claim 1, wherein said sheath lock includes a wire clamp.

5. A wire sheath for preventing entanglement of a wire as set forth in claim 1, wherein said sheath lock includes a wire tire.

6. A wire sheath for preventing entanglement of a wire as set forth in claim 1, wherein said first terminal ring including a first polymeric ring integral to said first end;
   said second terminal ring including a second polymeric ring integral to said second end;
   said sheath lock includes a wire clamp having an interior wire chamber and an exterior surface;
   said exterior surface of said sheath lock including a groove;
   said sheath lock having a lock diameter less than said cylindrical diameter for inserting said sheath lock into said first end of said cylindrical interwoven sheath; and
   said first polymeric ring engaging within said groove for terminating displacement of said sheath lock relative to said cylindrical interwoven sheath.

7. A wire sheath for preventing entanglement of a wire as set forth in claim 1, wherein a wire lead having an electrical coupler receptacle coupled to a lead wire for facilitating the insertion of the wire within said cylindrical interwoven sheath; and
   said wire lead inserting through said interior bore and thereafter said electrical coupler receptacle coupling with the electrical coupler for drawing the wire through the interior bore upon a drawing force being applied to said lead wire.

8. A wire sheath for preventing entanglement of a wire as set forth in claim 1, wherein said cylindrical interwoven sheath defining a plurality of planar rings positioned perpendicular to a plurality of planar ribbons.

9. A wire sheath for preventing entanglement of a wire, the wire having a cross-section dimension, the wire relaying electric current between a first end and a second end, the first end including an electrical coupler and the second end including an electrical receiver, the wire sheath, comprising:
   a cylindrical interwoven sheath defining an interior surface and an exterior surface extending between a first end and a second end;
   said interior surface defining an interior bore extending between said first end and said second end;
   said interior bore defining a cylindrical diameter;
   said cylindrical diameter greater than the cross-section dimension of the wire for positioning the wire through said interior bore of said cylindrical interwoven sheath;
   a first terminal ring engaging said first end of said cylindrical interwoven sheath for permitting displacement of said cylindrical interwoven sheath relative to the wire;
   a second terminal ring engaging said second end of said cylindrical interwoven sheath for permitting displacement of said cylindrical interwoven sheath relative to the wire;
   a sheath lock encompassing said cylindrical interwoven sheath and compressing said cylindrical interwoven sheath into the wire for terminating displacement of said cylindrical interwoven sheath relative to the wire;
   said cylindrical interwoven sheath having a tensile force for preventing a reduction of the distance between said first end and said second end;
   said cylindrical interwoven sheath having a linear retention force for preventing entanglement of the wire;
   said first terminal ring including a first polymeric ring integral to said first end;
   said second terminal ring including a second polymeric ring integral to said second end;
   said sheath lock includes a wire clamp having an interior wire chamber and an exterior surface;
   said exterior surface of said sheath lock including a groove;
   said sheath lock having a lock diameter less than said cylindrical diameter for inserting said sheath lock into the first end of said cylindrical interwoven sheath; and
   said first polymeric ring engaging within said groove for terminating displacement of said sheath lock relative to said cylindrical interwoven sheath.

10. A wire sheath for preventing entanglement of a wire, the wire having a cross-section dimension, the wire relaying electric current between a first end and a second end, the first end including an electrical coupler and the second end including an electrical receiver, the wire sheath, comprising:

a cylindrical interwoven sheath defining an interior surface and an exterior surface extending between a first end and a second end;

said interior surface defining an interior bore extending between said first end and said second end;

said interior bore defining a cylindrical diameter;

said cylindrical diameter greater than the cross-section dimension of the wire for positioning the wire through said interior bore of said cylindrical interwoven sheath;

a first terminal ring engaging said first end of said cylindrical interwoven sheath for permitting displacement of said cylindrical interwoven sheath relative to the wire;

a second terminal ring engaging said second end of said cylindrical interwoven sheath for permitting displacement of said cylindrical interwoven sheath relative to the wire;

a sheath lock encompassing said cylindrical interwoven sheath and compressing said cylindrical interwoven sheath into the wire for terminating displacement of said cylindrical interwoven sheath relative to the wire;

said cylindrical interwoven sheath having a tensile force for preventing a reduction of the distance between said first end and said second end;

said cylindrical interwoven sheath having a linear retention force for preventing entanglement of the wire; and said cylindrical interwoven sheath defining a plurality of planar rings positioned perpendicular to a plurality of planar ribbons.

* * * * *

UNITED STATES PATENT AND TRADEMARK OFFICE
CERTIFICATE OF CORRECTION

| | | |
|---|---|---|
| PATENT NO. | : 7,622,670 B1 | Page 1 of 1 |
| APPLICATION NO. | : 12/384032 | |
| DATED | : November 24, 2009 | |
| INVENTOR(S) | : Tracy L. Sanderson and Charles E. West | |

It is certified that error appears in the above-identified patent and that said Letters Patent is hereby corrected as shown below:

Title page, item 54 and at column 1, line 1, the title "JEWELRY TOOL" should read --WIRE SHEATH--.

Signed and Sealed this

Sixteenth Day of February, 2010

David J. Kappos
*Director of the United States Patent and Trademark Office*